United States Patent
Kim et al.

(10) Patent No.: US 7,742,319 B2
(45) Date of Patent: Jun. 22, 2010

(54) TRANSFORMER HAVING RESONANT INDUCTANCE

(75) Inventors: Don Sik Kim, Gyeonggi-do (KR); Gun Woo Moon, Daejeon-si (KR); Kyu Min Cho, Daejeon-si (KR); Young Do Kim, Daejeon-si (KR); In Ho Cho, Daejeon-si (KR); Hak Ryong Kim, Gyeonggi-do (KR); Jong Pil Kim, Gyeonggi-do (KR); Dong Joong Kim, Gyeonggi-do (KR); Tae Won Heo, Gyeonggi-do (KR); Sang Cheol Bong, Gyeonggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 98 days.

(21) Appl. No.: 12/212,123

(22) Filed: Sep. 17, 2008

(65) Prior Publication Data

US 2010/0033993 A1 Feb. 11, 2010

(30) Foreign Application Priority Data

Aug. 8, 2008 (KR) ...................... 10-2008-0077848

(51) Int. Cl.
*H02M 3/335* (2006.01)
*H02M 7/06* (2006.01)
*H02M 7/5387* (2006.01)

(52) U.S. Cl. ........................ 363/17; 363/132; 363/126; 363/47

(58) Field of Classification Search ................... 363/17, 363/132, 47, 126
See application file for complete search history.

(56) References Cited

U.S. PATENT DOCUMENTS 6,018,468 A * 1/2000 Archer et al. .................. 363/17
6,483,724 B1 11/2002 Blair et al.
7,136,293 B2 * 11/2006 Petkov et al. ............... 363/126

FOREIGN PATENT DOCUMENTS

KR 10-2007-0050138 A 5/2007

* cited by examiner

*Primary Examiner*—Shawn Riley
(74) *Attorney, Agent, or Firm*—Lowe Hauptman Ham & Berner LLP

(57) ABSTRACT

Provided is a transformer having resonant inductance, the transformer including a core that includes a first leg formed in one side thereof, a second leg which is formed in the other side thereof so as to be electromagnetically coupled to the first leg, and a third leg which is formed between the first and second legs so as to be electromagnetically coupled to the first and second legs; a primary winding that is wound around one side of the third leg; a secondary winding that is wound around the other side of the third leg so as to induce power through electromagnetic induction with the primary winding; and a resonant inductance winding that is wound around the outside of the core so as not to be magnetically induced by magnetic fluxes generated from the primary and secondary windings.

4 Claims, 3 Drawing Sheets

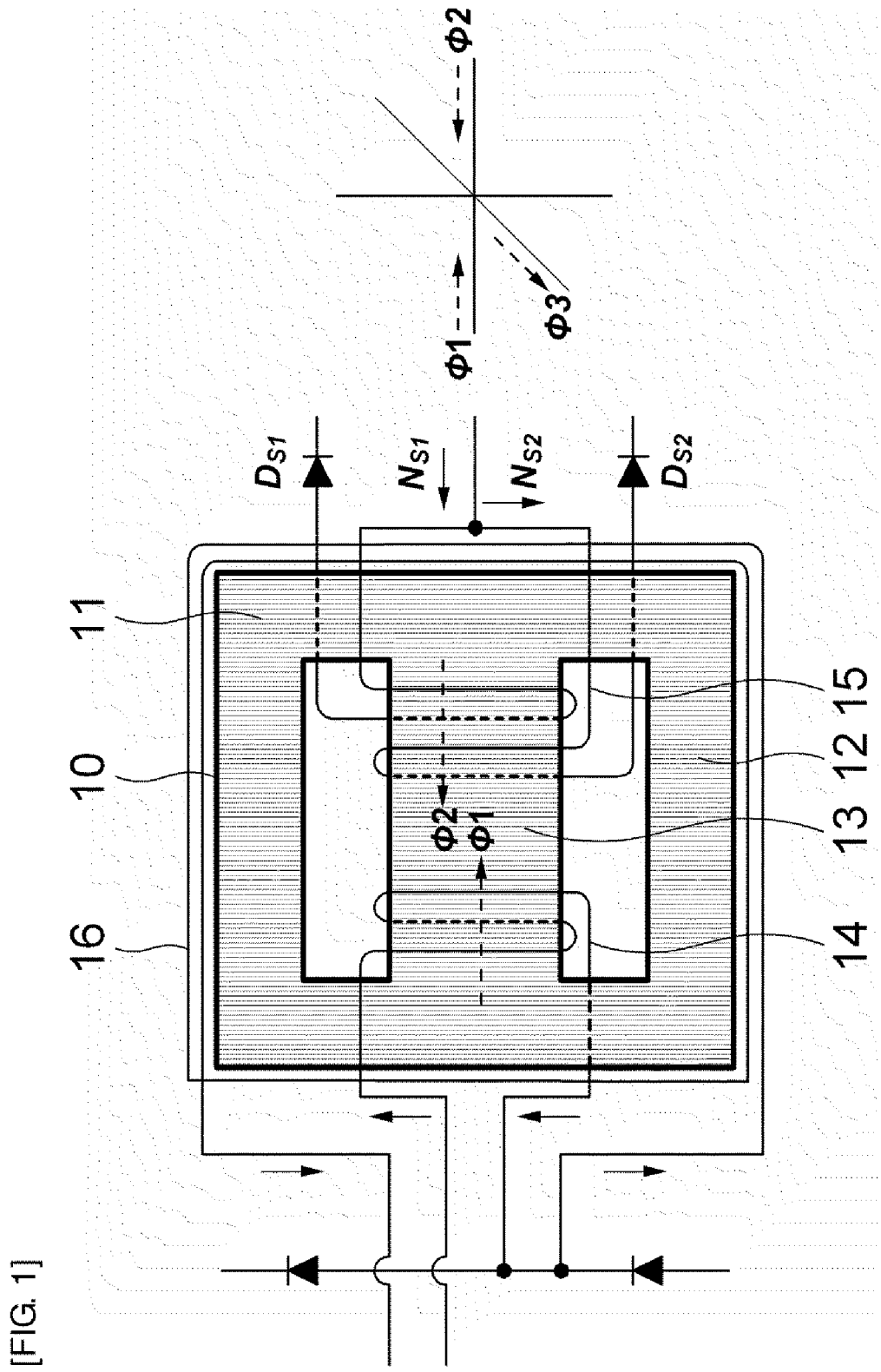
[FIG. 1]

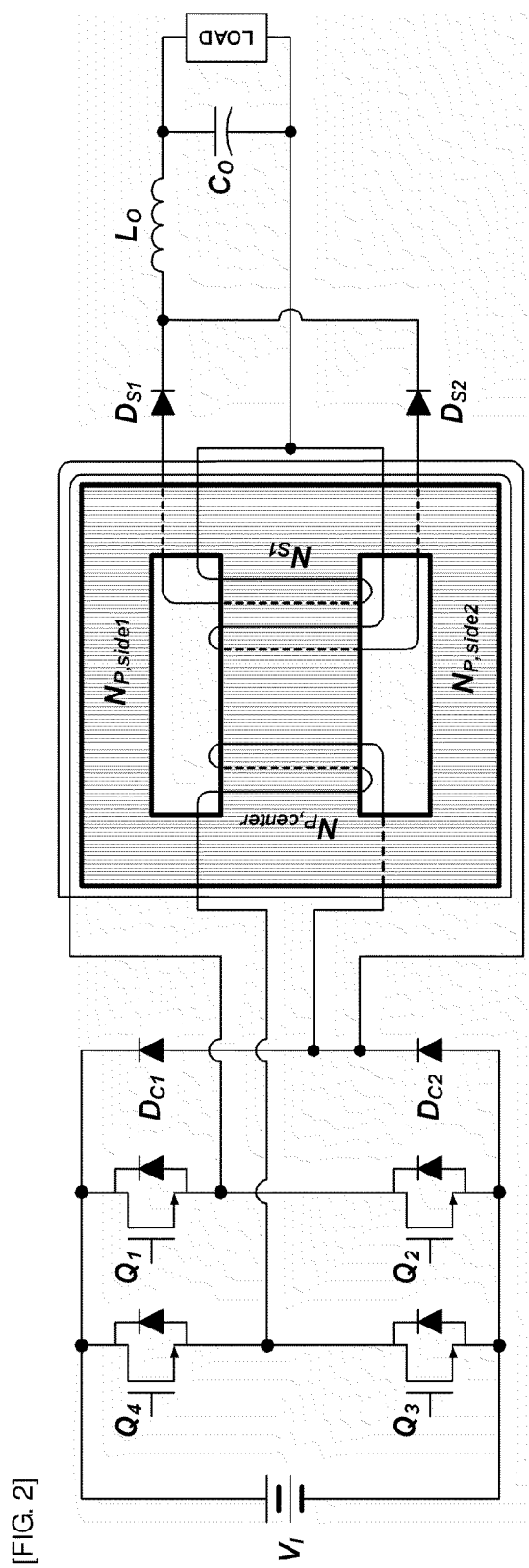
[FIG. 2]

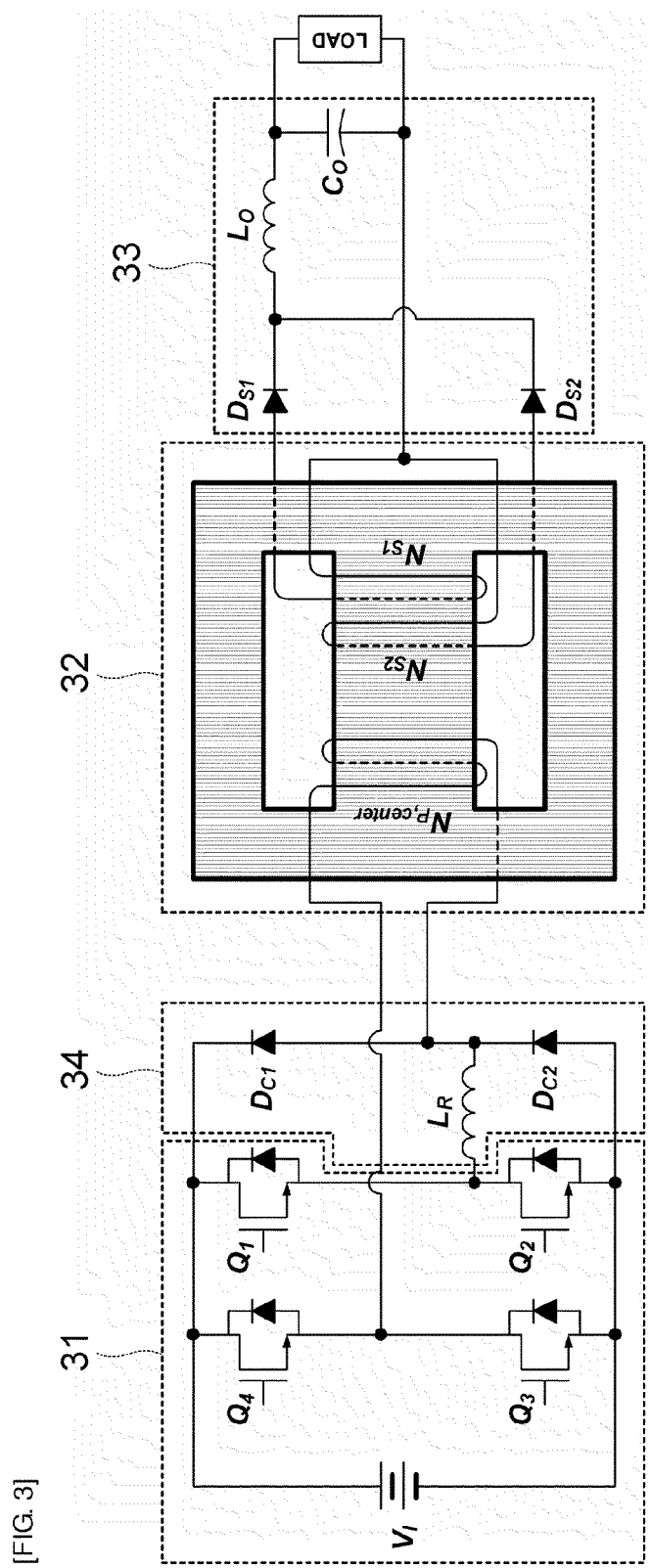
[FIG. 3]

TRANSFORMER HAVING RESONANT INDUCTANCE

CROSS-REFERENCE TO RELATED APPLICATIONS

This application claims the benefit of Korean Patent Application No. 10-2008-0077848 filed with the Korea Intellectual Property Office on Aug. 8, 2008, the disclosure of which is incorporated herein by reference.

BACKGROUND OF THE INVENTION

1. Field of the Invention

The present invention relates to a transformer having resonant inductance for zero voltage switching.

2. Description of the Related Art

Recent DC/DC power supply devices have the following two features.

First, they require a high input voltage. Recently, as the harmonic wave regulation tightens, a power factor correction circuit is universally and compulsorily used in various electric and electronic products. As a result, most power supply devices include a power factor correction circuit and a DC/DC converter. As for a general a power factor correction circuit, a booster converter is used. In the booster converter, an output is always higher than an input. Therefore, the output of the power factor correction circuit ranges from 385 to 415 Vdc on the basis of current common input line (85-265 Vac). As the output voltage is used as an input voltage of the DC/DC converter, most DC/DC power supply devices have a high input voltage.

Second, they required a low-voltage and high-current output. Processors which are driven at a low voltage are frequently used to reduce power consumption of communication devices. Further, for users' convenience, a number of functions are added to the respective processors, and thus power consumed in the respective processors inevitably increases. Therefore, most DC/DC power supply devices have a low voltage and high-current output.

As the DC/DC power supply devices have a high input voltage, a low output voltage, and a high-current output, voltage stress should be considered in the primary side, and current stress should be considered in the secondary side. Further, the DC/DC power supply devices should have a simple structure and a small volume, in order to implement high-power density. In general, as the switching frequency increases, the size of power devices decreases. In this case, however, efficiency decreases due to a switching loss. Therefore, zero voltage switching is essential for high efficiency. Further, the zero voltage switching is performed using leakage inductance and additional resonant inductance of a transformer.

SUMMARY OF THE INVENTION

An advantage of the present invention is that it provides a transformer having resonant inductance, in which a winding is wound in a direction where it is not magnetically induced by magnetic fluxes generated from currents of primary and secondary sides, and is then used as resonant inductance.

Additional aspect and advantages of the present general inventive concept will be set forth in part in the description which follows and, in part, will be obvious from the description, or may be learned by practice of the general inventive concept.

According to an aspect of the invention, a transformer having resonant inductance comprises a core that includes a first leg formed in one side thereof, a second leg which is formed in the other side thereof so as to be electromagnetically coupled to the first leg, and a third leg which is formed between the first and second legs so as to be electromagnetically coupled to the first and second legs; a primary winding that is wound around one side of the third leg; a secondary winding that is wound around the other side of the third leg so as to induce power through electromagnetic induction with the primary winding; and a resonant inductance winding that is wound around the outside of the core so as not to be magnetically induced by magnetic fluxes generated from the primary and secondary windings.

According to another aspect of the invention, a phase-shift full-bridge converter comprises a switching unit that switches an input voltage; a transformer that induces a primary-side voltage into a secondary side; a rectification unit, and a clamping diode and a resonant inductance that are connected between the switching unit and the primary side of the transformer. The transformer includes a core having first to third legs, and the resonant inductance is formed by a resonant inductance winding which is wound around the outside of the core so as not to be magnetically induced by magnetic fluxes generated from primary and secondary windings of the transformer.

In the core of the transformer, the first leg may be formed in one side of the core, the second leg may be formed in the other side of the core so as to be electromagnetically coupled to the first leg, and the third leg may be formed between the first and second legs so as to be electromagnetically coupled to the first and second legs.

The primary winding of the transformer may be wound around one side of the third leg, and the secondary winding may be wound around the other side of the third leg so as to induce power through electromagnetic induction with the primary winding.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a diagram showing a transformer having resonant inductance according to the present invention;

FIG. 2 is a diagram showing a phase-shift full-bridge converter including the transformer having resonant inductance according to the invention; and FIG. 3 is a diagram showing resonant inductance by a resonant inductance winding of a core of FIG. 2 using an equivalent circuit.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures. In the drawings, the thicknesses of layers and regions are exaggerated for clarity.

Hereinafter, a transformer having resonant inductance according to the present invention will be described in detail with reference to the accompanying drawings.

FIG. 1 is a diagram showing a transformer having resonant inductance according to the present invention.

Referring to FIG. 1, the transformer having resonant inductance according to the invention includes a core 10, a primary winding 14, a secondary winding 15, and a resonant inductance winding 16.

The core 10 may include a first leg 11 formed in one side thereof, a second leg 12 which is formed in the other side thereof so as to be electromagnetically coupled to the first leg 11, and a third leg 13 which is formed between the first and second legs 11 and 12 so as to be electromagnetically coupled to the first and second legs 11 and 12.

The primary winding 14 is wound around one side of the third leg 13 so as to form a primary side of the transformer.

The secondary winding 15 is wound around the other side of the third leg 13 so as to induce power through electromagnetic induction with the primary winding 14 and forms a secondary side of the transformer.

The resonant inductance winding 16 is wound along the outside of the core 10 so as not to be magnetically induced by magnetic fluxes generated from the primary and secondary windings 14 and 15, thereby forming resonant inductance. That is, the resonant inductance winding 16 is wound in a direction where it is not magnetically induced by magnetic fluxes generated by currents of the primary and secondary sides of the transformer, and is then used as resonant inductance for zero voltage switching.

Specifically, when a current flows in the primary winding 14, a magnetic flux $\phi 1$ is generated. The magnetic flux $\phi 1$ is interlinked with the secondary winding 15 through the core 10. At this time, in the core 10 within the secondary winding 15, a magnetic flux $\phi 2$ is generated in a direction where it interferes with the magnetic flux $\phi 1$ generated by the primary winding 14. Then, an electromotive force is generated in the secondary winding 15 by the magnetic flux $\phi 2$ such that currents can flow (magnetic induction).

When the resonant inductance winding 16 is wound along the outside of the core 10 in a direction where it is not interlinked with the magnetic flux $\phi 1$ by the primary-side current, magnetic induction does not occur. That is because, since a magnetic flux $\phi 3$ generated by the resonant inductance winding 16 is not coupled to the magnetic fluxes $\phi 1$ and $\phi 2$ generated in the primary and secondary sides, respectively, the resonant inductance winding independently operates. That is, as the directions of the windings are differently set in a spatial manner in the core 10, resonant inductance can be formed without using an additional inductance core.

FIG. 2 is a diagram showing a phase-shift full-bridge converter including the transformer having resonant inductance according to the invention. FIG. 3 is a diagram showing the resonant inductance by the resonant inductance winding 16 of the core 10 of FIG. 2 using an equivalent circuit.

Referring to FIGS. 2 and 3, the phase-shift full-bridge converter including the transformer having resonant inductance according to the invention includes a switching unit 31 which switches an input voltage, the transformer 32 which boosts a primary-side voltage into a secondary side, a rectification unit 33, and a clamping diode Dc and a resonant inductor LR which are connected between the switching unit 31 and the transformer 32.

The resonant inductor LR may be formed by the resonant inductance winding which is wound along the outside of the core so as not to be magnetically induced by magnetic fluxes generated from the primary and secondary windings of the transformer 32. That is, the transformer 32 has the same structure as the transformer of FIG. 1. When only the resonant inductor LR is represented as an equivalent circuit, the resonant inductance can be represented as shown in FIG. 3.

The phase-shift full-bridge converter including the transformer having resonant inductance according to the invention is a converter which removes voltage ringing of a secondary-side synchronous rectifier by using the resonant inductor LR and the primary-side clamping diode Dc.

The phase-shift full-bridge converter having resonant inductance according to the invention guarantees zero-voltage switching of a lagging leg switch by using resonant inductance. When voltage ringing occurs in the secondary-side synchronous rectifier, the primary-side clamping diode Dc operates so as to prevent added resonant inductance from participating in voltage resonance, thereby removing the voltage ringing of the secondary-side synchronous rectifier.

Further, the phase-shift full-bridge converter having resonant inductance according to the invention forms resonant inductance without using an additional resonant inductor core. That is, the resonant inductance winding is wound in a direction where it is not magnetically induced by magnetic fluxes generated by currents of the primary and secondary sides of the transformer, and is then used as the resonant inductance. Therefore, it is possible to prevent a loss of the core caused by an added resonant inductor.

According to the present invention, the resonant inductance winding is wound in a direction where it is not magnetically induced by magnetic fluxes generated from currents of the primary and secondary sides of the transformer, and is then used as the resonant inductance. Therefore, the resonant inductance can be formed without using an additional inductor core, which makes it possible to reduce the size of the entire system and the manufacturing cost. Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A transformer having resonant inductance, comprising:
   a core that includes a first leg formed in one side thereof, a second leg which is formed in the other side thereof so as to be electromagnetically coupled to the first leg, and a third leg which is formed between the first and second legs so as to be electromagnetically coupled to the first and second legs;
   a primary winding that is wound around one side of the third leg;
   a secondary winding that is wound around the other side of the third leg so as to induce power through electromagnetic induction with the primary winding; and
   a resonant inductance winding that is wound around the outside of the core so as not to be magnetically induced by magnetic fluxes generated from the primary and secondary windings.

2. A phase-shift full-bridge converter comprising:
   a switching unit that switches an input voltage;
   a transformer that induces a primary-side voltage into a secondary side;
   a rectification unit, and
   a clamping diode and a resonant inductance that are connected between the switching unit and the primary side of the transformer,
   wherein the transformer includes a core having first to third legs, and the resonant inductance is formed by a resonant inductance winding which is wound around the outside of the core so as not to be magnetically induced by magnetic fluxes generated from primary and secondary windings of the transformer.

3. The phase-shift full-bridge converter according to claim 2, wherein in the core of the transformer, the first leg is formed in one side of the core, the second leg is formed in the other side of the core so as to be electromagnetically coupled to the first leg, and the third leg is formed between the first and second legs so as to be electromagnetically coupled to the first and second legs.

4. The phase-shift full-bridge converter according to claim 3, wherein the primary winding of the transformer is wound around one side of the third leg, and the secondary winding is wound around the other side of the third leg so as to induce power through electromagnetic induction with the primary winding.

* * * * *